DRIVING ARRANGEMENT FOR MAGNETIC DEVICES
Filed April 24, 1963
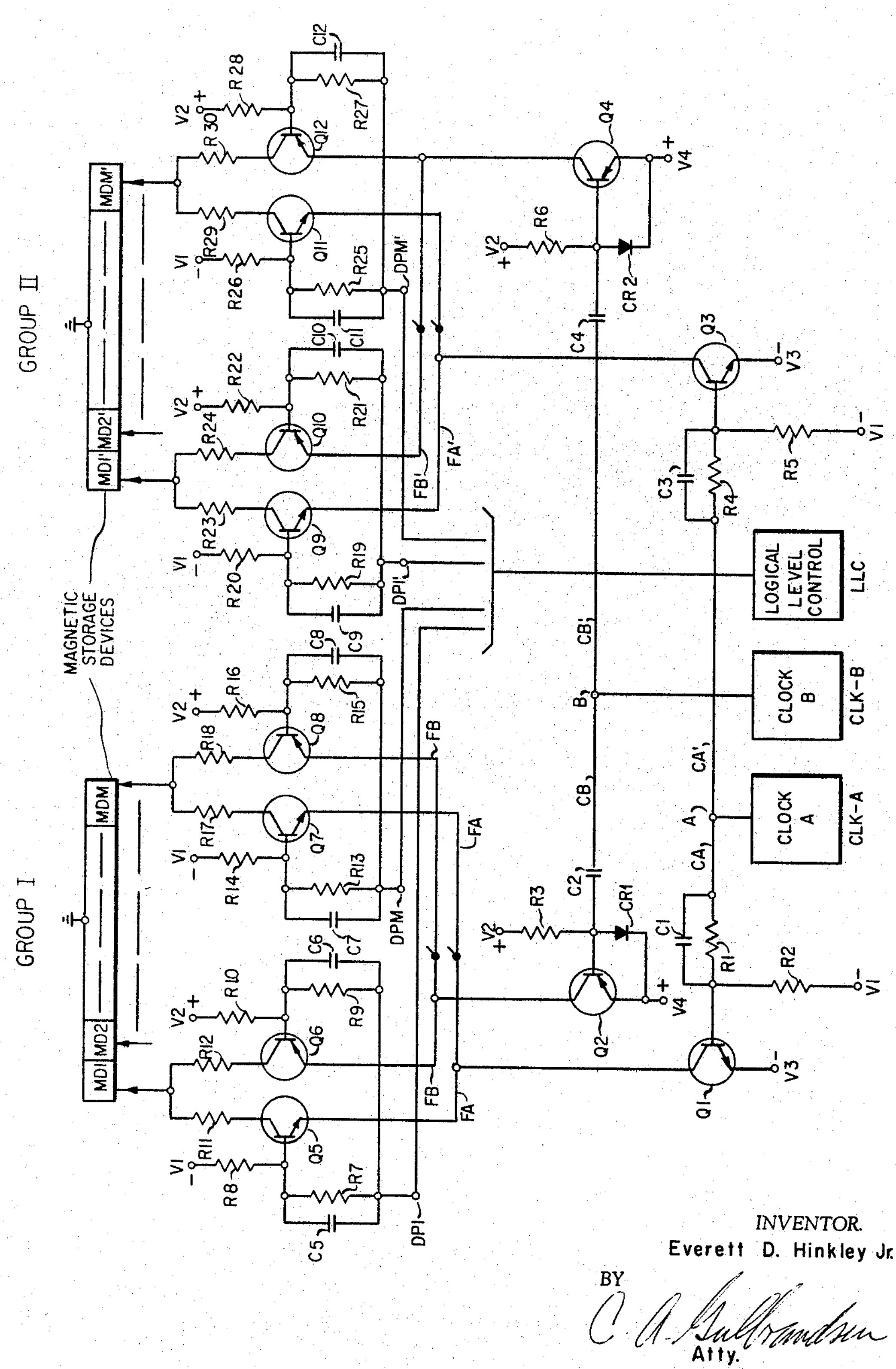
INVENTOR.
Everett D. Hinkley Jr.
BY
Atty.

United States Patent Office 3,333,256
Patented July 25, 1967

3,333,256
DRIVING ARRANGEMENT FOR MAGNETIC DEVICES

Everett D. Hinkley, Jr., Evanston, Ill., assignor to Automatic Electric Laboratories, Inc., Northlake, Ill., a corporation of Delaware

Filed Apr. 24, 1963, Ser. No. 275,399
7 Claims. (Cl. 340—174)

The invention relates to arrangements for selectively providing a current of one direction or another direction through a load, and in particular to driving circuits for magnetic memories.

It is well known in the art to use various types of driver circuits to perform a portion of the WRITE or a portion of the INHIBIT function of a coincident current driving scheme for magnetic storage devices. The functions of WRITE and INHIBIT, hereinafter referred to only as WRITE and INHIBIT or similar functions of STORE-ONE and STORE-ZERO or WRITE and ERASE, according to the particular memory system, are performed by a current of a first direction to cause a binary ONE condition on the one hand and a current of the opposite direction to cause a binary ZERO condition on the other hand. In order to accomplish the above functions separate circuits have been designed for each type of function. Some such circuits require complicated switching arrangements in order to be integrated into the magnetic memory system. Others require switches and driving arrangements for each individual magnetic storage element. The present invention provides, through its novel switching arrangement, current of one direction or an opposite direction to perform these partial WRITE and INHIBIT functions and relies only on the input voltage level of one terminal to determine the function to be performed.

In the embodiment described herein a combination of PNP and NPN transistors appear at high or low impedances, open and close switches, in response to the input voltage level from a logically programmed voltage level control apparatus, which may access the magnetic memory at random or sequentially as preferred in a specific situation.

Advantageously, the invention may be applied to memory systems which employ magnetic wire devices as storage elements; the current direction through the magnetic device representing the WRITE function or the INHIBIT function. Such devices are described by A. H. Bobeck in the November, 1947 issue of the Bell System Technical Journal, vol. XXXVI.

The object of the invention is to provide a novel and improved driving circuit arrangement for magnetic memory systems.

Another object of the invention is to provide a driving circuit arrangement having the ability to provide current in one sense or an opposite sense.

A still further object of the invention is to provide a driving circuit arrangement in which the selection of the direction of current is controlled by the input signal level.

Other objects and features of the invention will become apparent and the invention will best be understood by the following description of one embodiment of the invention taken in conjuction with the accompanying drawing.

Referring to the figure, a driving circuit arrangement for a plurality of magnetic devices is shown. For purpose of illustration, the repersentation shows a plurality of transistors Q1 through Q12, divided into two groups, GROUP I and GROUP II, for driving the magnetic storage devices MD1, MD2 . . . MDM and MD1', and MD2' . . . MDM', respectively. A magnetic memory system could of course employ more than two such groups; the dendritic pattern of the driving arrangement being dependent on the requirements of the circuits and the capabilities of the components employed therein. In addition to transistors Q1 through Q12 and their associated circuit components, the figure also includes such control apparatus as the clocks CLK–A, CLK–B and the logical level control apparatus LLC. Clocks CLK–A and CLK–B, connected to input points A and B respectively, indirectly control transistors Q5 through Q12 by way of transistors Q1 through Q4, as will be explained below. The logical level control apparatus LLC is connected to the driving points DP1 through DPM and DP1' through DPM' and directly controls the states of transistors Q5 through Q12 in accordance with the states of transistors Q1 through Q4, that is, in accordance with clocks CLK–A and CLK–B.

Transistor Q5 has its collector connected to ground by way of resistance R11 and magnetic device MD1 and its emitter connected to the potential V3 by way of the collector-emitter path of transistor Q1. Transistor Q6 has its collector connected to ground by way of resistance R12 and magnetic device MD1 and its emitter connected to the potential V4 by way of the collector-emitter path of transistor Q2. The base electrodes of transistors Q5 and Q6 are coupled to the driving point DP1 by way of the resistance-capacitance couplings R7, C5 and R9, C6 respectively. The base electrode of transistor Q5 is connected to potential V1 by way of resistance R8 and the base electrode of transistor Q6 is connected to the potential V2 by way of resistance R10.

The base electrode of transistor Q1 is resistance-capacitance coupled to point A by resistance R1 and capacitance C1 and the base electrode is also connected to the potential V1 by way of resistance R2. The base electrode of transistor Q2 is capacitance coupled to point B by way of capacitor C2 and is connected to the potential V2 by way of resistance R3. The other transistors and their associated components in Group I and in Group II are similarly connected, reference in this respect being made to the above. The remaining circuitry of Group I is similarly connected to transistors Q1 and Q2 by the electrical connections FA and PB, respectively. Group II is controlled by clock CLK–A and by clock CLK–B in the same manner as in Group I from the input connections at points A and B by way of the electrical connections CA' and CB'.

Assuming that V1 and V2 equal −20 volts and +20 volts respectively, and that V3 and V4 equal −10 volts and +10 volts respectively, and also assuming that the NPN transistors provide a current path in a direction to perform the WRITE function and the PNP transistors provide a current path in a direction to perform the INHIBIT function, the following description of operation is given.

Simultaneous input pulses from clock CLK–A and from clock CLK–B overcome the bias circuits of transistors Q1 through Q4 and change their states from cutoff to saturation. Since the collector-emitter voltage is now small, say less than 0.4 volts, approximately 10 volts appears across each of the transistors Q5 through Q12.

The voltage levels which appear on the driving points DP1 through DPM' determine whether a magnetic device will receive a WRITE current pulse or an INHIBIT current pulse. The point which is driven, for example DPM, determines which magnetic device is effected. Using the example of driving point DPM, if DPM is placed at ground potential, transistor Q8, a PNP transistor, is cutoff and appears as a very high impedance (open switch) to current attempting to flow "into" the magnetic device MDM. On the other hand, transistor Q7, an NPN transistor, is saturated, and therefore allows current to flow "out" of magnetic device MDM. The completed series current path is from ground, through device MDM, resistance R17, the collector-emitter path of transistor Q7, through connection FA, through the collector-emitter path of transistor Q1 to potential V3. The amplitude of this current can be determined by resistance R17 in accordance with the equation $$I=\frac{10-V_{CEQ1}-V_{CEQ7}}{R17}$$

where $V_{CEQ1}$ is the collector-emitter voltage of transistor Q1 and $V_{CEQ7}$ is the collector-emitter voltage of transistor Q7. For example, if the collector-emitter voltage of transistors Q1 and Q7 are each 0.4 volt, and resistance R17 is 180 ohms, then the current, according to the above equation is approximately 51 ma. The magnetic field contribution caused by this current in coincidence with the magnetic field contribution of the solenoids (not shown) will effect the WRITE or INHIBIT function, as the case may be.

The following component values were used in one particular design.

| Resistances: | Ohms |
|---|---|
| R1, R4 | 820 |
| R2, R5, R10, R16, R22, R28 | 8,200 |
| R3, R6 | 47,000 |
| R7, R13, R19, R25 | 4,700 |
| R8, R14, R20, R26 | 100,000 |
| R9, R15, R21, R27 | 10,000 |
| R11, R12, R17, R18, R23, R24, R29, R30 | 180 |

| Capacitances: | Micro-farads |
|---|---|
| C1, C3 | 0.002 |
| C2, C4 | 0.01 |
| C5, C7, C9, C11 | 200 |
| C6, C8, C10, C12 | 500 |

A partial WRITE or INHIBIT pulse must be applied to each magnetic device. As a result, a ONE or a ZERO will be stored in the case of a magnetic wire, beneath that solenoid which is also pulsed. In the above-mentioned design, which employed magnetic wires, the wire pulses were approximately 50 milliamperes in amplitude, 700 nanoseconds in duration, and had rise and fall times of less than 100 nanoseconds.

If the voltage level at driving point DPM was placed at −10 volts by the logical level control apparatus LLC, then transistor Q7 would appear as a high impedance, whereas transistor Q8 would saturate and allow current to flow "into" magnetic device MDM. Since the resistance R18 is the same value resistance R17, this current is equal in amplitude to that previously calculated by the above equation, but in an opposite sense.

The input circuitry to all transistors, with the exception of transistors Q2 and Q4, is resistance-coupled with the bypass capacitors, such as capacitance C7, rendering initial and final over-driving for fast turn-on and turn-off, respectively.

In a particular design the voltage and current requirements of the above input circuit were impractical for the circuitry of transistors Q2 and Q4 to be similar to that of transistors Q1 and Q3, and therefore a capacitive-coupled network was utilized. Diodes CR1 and CR2 maintain the cutoff base voltage level slightly higher than the emitter level, say pulse 10 volts.

Since the NPN transistors provide one current direction, while the PNP transistors provide the other current direction, judicious biasing enables the WRITE or INHIBIT decision to be made by controlling the voltage level of a single input. If the input remains at, say 0 volts, WRITE current will flow, whereas if the input is at, say −10 volts, INHIBIT current will flow and the particular magnetic device will be affected accordingly. However, no current will flow in either direction unless clocks CLK-A and CLK-B enable the transistor circuits Q1 through Q4.

The remainder of the circuitry of both GROUP I and GROUP II operates in the same manner as above by virtue of connections FA, FB, FA′, FB′, CA′ and CB′.

While the invention has been described in one specific embodiment and by illustrative examples, changes and modifications may be made by one skilled in the art without departing from the spirit and scope of the invention and should be included in the appended claims.

What is claimed is:

1. An arrangement for selectively providing a current of one direction or the other direction through a load, said arrangement comprising: first and second sources of simultaneously occurring pulses; first and second switching means respectively coupled to said first and second sources of pulses, said first and second switch means being simultaneously operated in response to pulses from the respective first and second sources input level control apparatus; and third and fourth switching means respectively connected to said first and second switching means, said third and fourth switching means having a common input connection from said control apparatus and a common output connection to said load, said first and third switching means or said second and fourth switching means being selectively operated depending on the output level of said level control apparatus for causing current to flow through said load in a direction determined by said output level.

2. An arrangement for selectively providing a current of one direction or the other direction through a load, as claimed in claim 1, wherein the pulses of said first source and the pulses of said second source are of opposite polarity.

3. An arrangement for selectively providing a current of one direction or the other direction through a load, as claimed in claim 1, wherein each of said switching means includes a transistor having a base, an emitter and a collector, said load and the emitter-collector paths of said transistors of said first and third switching means being serially connected to form a path for current of one direction through said load, and said load and the emitter-collector paths of said transistors of said second and fourth switching means being serially connected to form a path for current of opposite direction through said load.

4. In a magnetic memory system including a plurality of magnetic devices, a circuit arrangement for selectively providing a current of one direction or the other direction for each of said devices, said arrangement comprising: first and second sources of simultaneously occurring pulses; a first switching means operable responsive to said first pulses; second switching means operable responsive to said second pulses; a plurality of third switching means each associated with separate ones of said plurality of magnetic devices; a plurality of fourth switching means each associated with separate ones of said plurality of third switching means to provide a pair of switching means for each of said magnetic devices, each of said third switching means being conditioned for operation responsive to the operation of said first switching means, each of said fourth switching means being conditioned to operate responsive to the operation of said second switching means; and logical level control apparatus for selecting proper pairs of third and fourth switching means pairs, said apparatus having an output coupled to each of said third and fourth switching means, whereby one of said switching means of the selected pair of said third and fourth switching means is operated responsive to the output level of said logical level control apparatus.

5. In a magnetic memory system, as claimed in claim 4, wherein each of said third switching means includes a transistor of one base-emitter polarity and wherein each of said fourth switching means includes a transistor having an opposite base-emitter polarity, and wherein each of said third and fourth switching means have input circuits which are commonly connected to said logical level control apparatus, whereby one output level of said level control apparatus enables only said third switching means and another output level of said control apparatus enables only said fourth switching means.

6. A circuit arrangement for selectively providing a current of one direction or the other direction through a load, said arrangement comprising: first and second sources of simultaneously occurring pulses; first and second sources of direct current; level control apparatus; first, second, third and fourth switching means; electrical circuit connections establishing a first series circuit including said first source of direct current, said first switching means, said third switching means and said load; and electrical circuit connections establishing a second series circuit including said second source of direct current, said second switching means, said fourth switching means and said load, said first and second switching means respectively coupled to said first and second sources of pulses and respectively and simultaneously operable responsive thereto to partially complete said first and second series circuits, said third and fourth switching means having a common control terminal connected to said input level control apparatus, whereby either said third or fourth switching means is operated responsive to the output level of said level control apparatus and to the operation of said first and second switching means to complete only one of said first and second series circuits.

7. In a magnetic memory system including a plurality of magnetic devices, a circuit arrangement for providing a current of one direction or the other direction for each of said devices, said arrangement comprising: first and second sources of pulses; logical level control apparatus; first and second sources of direct current; first and second switching means; a plurality of third switching means each coupled to a separate one of said plurality of magnetic devices; a plurality of fourth switching means each coupled to a separate one of said plurality of third switching means to provide a pair of switching means for each of said magnetic devices; electrical circuit connections between said first switching means and each of said third switching means for establishing a plurality of first series circuits including said first source of direct current, said first switching means, each of said third switching means and each of said magnetic devices; and other electrical circuit connections between said second switching means and each of said fourth switching means for establishing a plurality of second series circuits including said second source of direct current, said second switching means, each of said plurality of fourth switching means and each of said magnetic devices, said first and second switching means being coupled to said first and second sources of pulses respectively, and respectively operable responsive thereto to partially complete said first and second pluralities of series circuits, each pair of said third and fourth switching means having a common input connection from said logical level control apparatus, whereby one switching means of each said pair is operated responsive to the operation of said first and second switching means and selectively responsive to the output level of said logical level control apparatus for completing only one of said pluralities of series circuits, said magnetic devices being effected by a magnetic field having a direction according to the current direction of a completed one of said series circuits.

References Cited

UNITED STATES PATENTS

| | | | |
|---|---|---|---|
| 2,993,198 | 7/1961 | Barnes | 340—174 |
| 3,027,546 | 3/1962 | Howes | 340—174 |
| 3,154,763 | 10/1964 | Bornhauser | 340—174 |
| 3,175,203 | 3/1965 | Bice | 340—174 |

BERNARD KONICK, *Primary Examiner.*

JAMES W. MOFFITT, *Examiner.*

M. S. GITTES, *Assistant Examiner.*